Jan. 2, 1962  A. R. VOGEL ETAL  3,015,702
MULTICHANNEL AUDIO WARNING SYSTEM
Filed May 29, 1959  3 Sheets-Sheet 1

INVENTORS:
Alvin R. Vogel
David E. Ruch
Leland W. Bagby

By Willard M. Graham
Agent

Jan. 2, 1962 A. R. VOGEL ETAL 3,015,702
MULTICHANNEL AUDIO WARNING SYSTEM
Filed May 29, 1959 3 Sheets-Sheet 2
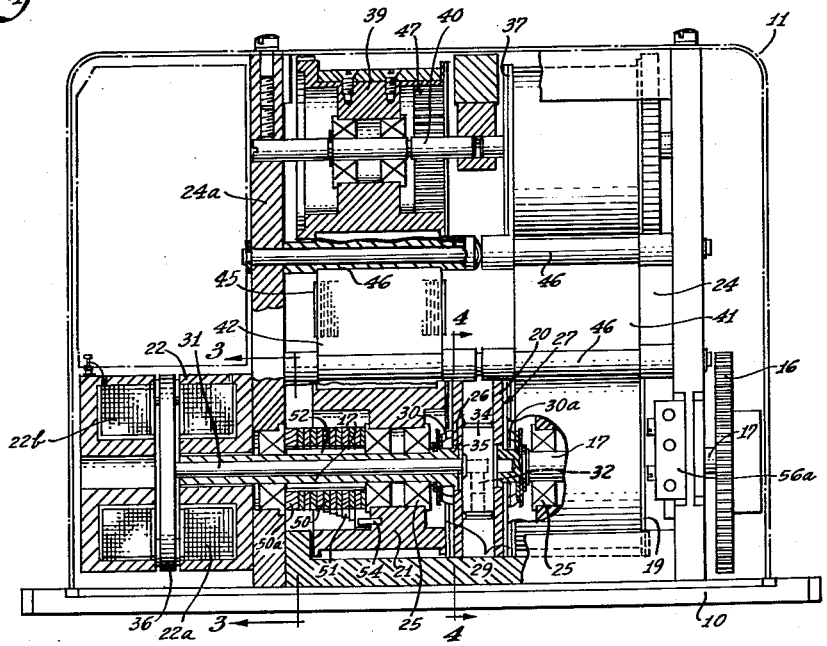
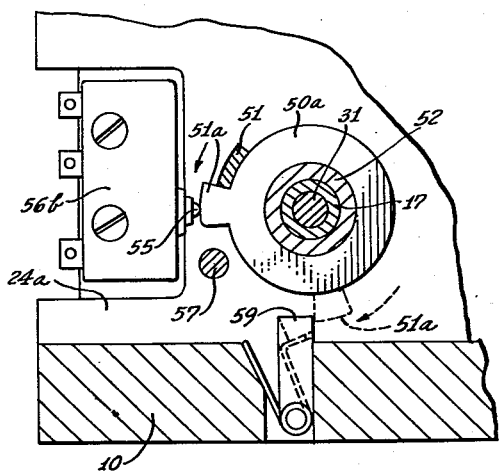
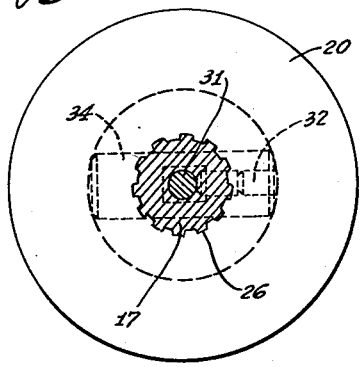
INVENTORS:
Alvin R. Vogel
David E. Ruch
Leland W. Bagby
By Willard M. Graham
Agent Jan. 2, 1962 A. R. VOGEL ETAL 3,015,702
MULTICHANNEL AUDIO WARNING SYSTEM
Filed May 29, 1959 3 Sheets-Sheet 3

INVENTORS:
Alvin R. Vogel
David E. Rush
Leland W. Bagby

United States Patent Office 3,015,702
Patented Jan. 2, 1962

3,015,702
MULTICHANNEL AUDIO WARNING SYSTEM
Alvin R. Vogel, Los Angeles, David E. Ruch, Playa Del Rey, and Leland W. Bagby, La Puente, Calif., assignors to Northrop Corporation, Beverly Hills, Calif., a corporation of California
Filed May 29, 1959, Ser. No. 816,948
17 Claims. (Cl. 179—100.2)

The present invention relates to safety measures, and more particularly, to a multiple-channel audio warning system for installation in an aircraft, for example, to warn the pilot of emergencies and malfunctions when they occur.

Various sensors are customarily placed in appropriate locations in an aircraft to detect malfunctions, such as fire, landing gear unsafe, and the like, and the sensors are connected to respective indicators such as instruments on the instrument panel, warning horns, or lights. This is intended, of course, to notify the pilot as quickly as possible, so that he can correct the malfunction or take proper action as necessary. However, in spite of the known warning indicators, accidents still happen which might or could have been prevented by proper procedure following the signalling of the warning.

In one present-day airplane, there are about 138 warning lights, and these obviously cannot all be monitored continuously by the pilot. In other cases, a pilot who would react properly under normal calm conditions becomes confused in an emergency and simply makes an error. Despite all attempts to eliminate unnecessary wheels-up landings, for instance, landings are still being made without remembering to lower the landing gear.

It is known that previous devices have been proposed to cause a verbal warning or notice to an operator of a vehicle when a certain situation occurs. This is done by automatically energizing a reproducing circuit for a prerecorded message. However, known devices are limited in many respects, such as in the number and length of possible warnings, not being able to select priority of warnings in the event of two or more existing emergencies, excessive amount of time delay before giving the proper warning, or not repeating warnings.

Our invention is an improvement over existing warning systems, and has among its objects:

To provide an audio warning system giving instant transmission of a warning of higher priority than one that might be in progress, and starting the new warning at its beginning, To provide an audio warning system having negligible time delay at the end of each warning message cycle when continuous warning is required, regardless of the length of the warning message or procedure, To provide warning messages up to fifteen seconds in length, for example, while still retaining the previous objects, To provide a multiple channel audio warning system having a versatile design, small size, and reliable components, for optimum suitability in an aircraft, To provide an audio warning system operable on the wide range of power supply voltage which might be encountered in an airplane, and To provide an audio warning system requiring no warm-up time and no standby power consumption.

Briefly, our invention comprises a mechanical arrangement of two separate multichannel signal reproducing assemblies with a single motor and two-way drive mechanism therebetween so that either reproducing assembly alone can be driven, together with an electrical control network which engages one drive mechanism and selects the proper channel thereof when any one of a plurality of warning sensors is actuated. Each reproducing assembly is preferably spring-returned to a start position when not engaged with the motor. The electrical network includes logic means by which in the event that two or more warning sensors are actuated, only the channel having a predetermined higher priority will be selected, and by which a higher priority warning coming while a lower priority message is in progress will switch the motor drive immediately to the idle reproducing assembly and thus start the new channel at its beginning. Of course the various sound channels will, in actual use of this invention, have pre-recorded messages thereon.

The priority means in the present instance comprises a bi-stable switching means which is triggered by the higher priority warning signal and controls the respective energization and drive connection of the two reproducing assemblies. Further, an additional trigger is provided by a limit switch circuit which operates at the end of a message channel to switch to the standby assembly for continuous repetition until the system is purposely shut off or the difficulty is corrected and no longer exists.

Other objects and advantages of the present invention will be noted in the description of specific apparatus to follow, which description is illustrative of only the embodiments shown herein, and other types of apparatus can also be employed within the scope of the invention.

In the accompanying drawings,

FIGURE 2 is a longitudinal section view of the apparatus in FIGURE 1, being cut away at different levels to show the various components.

FIGURE 3 is an enlarged sectional view taken as indicated by broken line 3—3 in FIGURE 2, showing details of a limit switch and stops.

FIGURE 4 is an enlarged sectional view taken as indicated by broken line 4—4 in FIGURE 2, showing details of a clutch connection.

Figure 1:
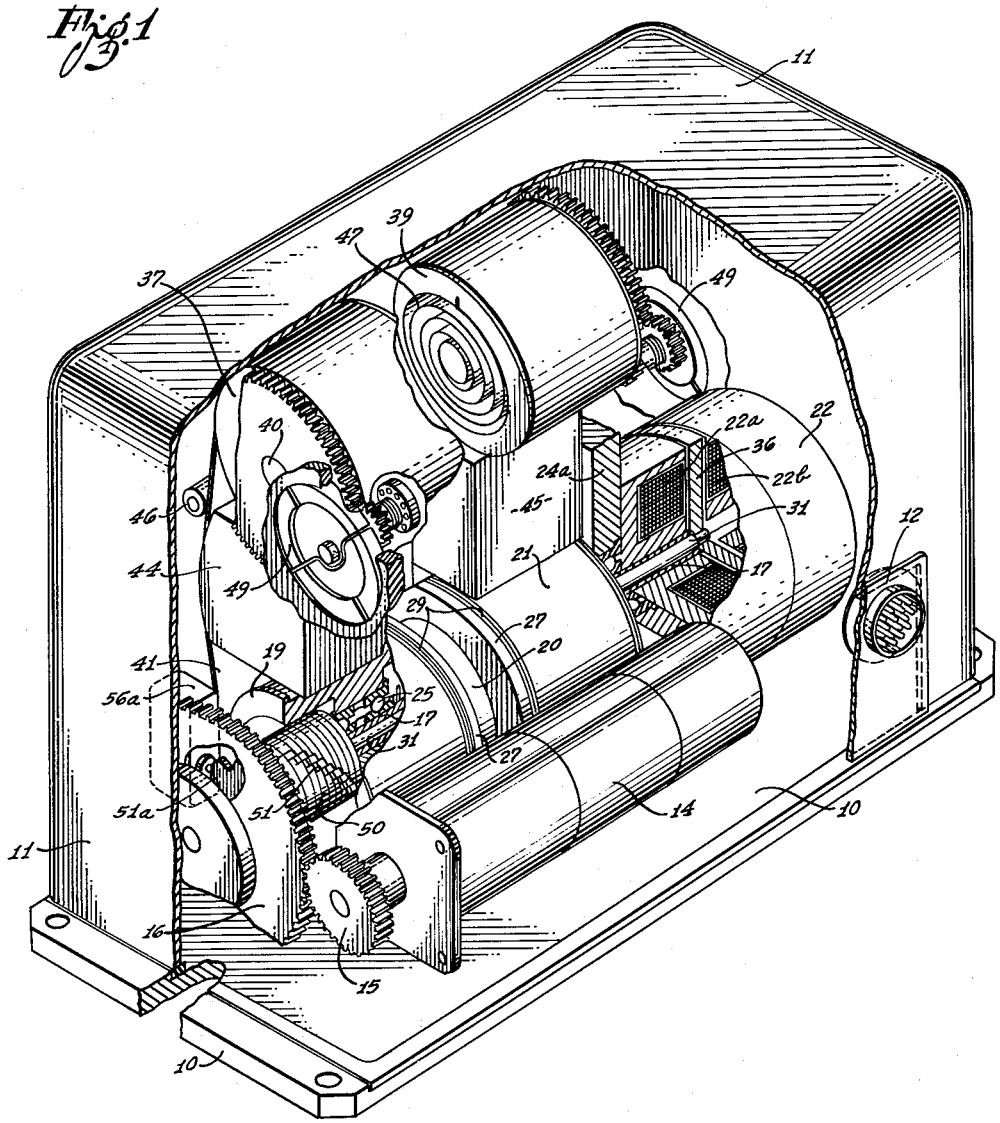
FIGURE 1 is a cut-away isometric view showing the reproducing assemblies and drive mechanisms of the present invention.

Referring first to FIGURE 1 for a detailed description, a main mounting platform 10 carries a removable housing 11 which contains the entire system with the exception of remotely located sensors (not shown) which are connected by wiring through an electrical plug 12. Since the plug 12 is not attached to the housing 11, the system can be operated with the housing removed. A motor 14, including a governor and gear train, has a motor pinion 15 meshing with a drive gear 16. For further description, both FIGURES 1 and 2 are referred to, and it will be noted that the left end of FIGURE 2 corresponds to the right end of FIGURE 1, thus illustrating both sides of the assembly.

The drive gear 16 is fixed to a hollow power shaft 17 which passes through a first tape take-up reel 19, a clutch spool 20, a second take-up reel 21, and half of a bi-directional solenoid 22. The power shaft 17 rotates in bearings in two end plates 24 and 24a, and the two take-up reels 19 and 21 are rotatably mounted on the power shaft 17 by means of additional bearings 25. The clutch spool 20 is axially slidable on the power shaft 17 through a splined connection 26 (see FIGURE 4) which causes the clutch spool 20 to be rotatably driven by the power shaft 17.

Each end of the clutch spool 20 forms a clutch plate 27, and a clutch facing 29 is provided on the inner adjacent end of each take-up reel 19 and 21. Normally, the clutch is centered between the reels by clutch return springs 30 and 30a. A push-pull rod 31 is installed inside the power shaft 17 and is connected at one end by a set screw 32 and a coupling pin 34 (FIGURE 4) to the clutch spool 20. Coupling pin 34 extends through a slot 35 in the power shaft 17. The other end of the push-pull rod 31 is connected to a circular armature 36 located between two solenoid coils 22a and 22b of the bi-directional solenoid 22.

If solenoid 22a is energized, the clutch assembly will couple the motor-driven power shaft 17 with first take-up reel 19. If solenoid 22b is energized, the second take-up reel 21 will be coupled. A small clearance is maintained between the armature 36 and the face of the energized solenoid which allows the armature 36 to rotate with the power shaft 17. The solenoid coils do not revolve and thus no slip-rings are needed.

A first recoil reel 37 and a second recoil reel 39 are rotatably mounted on shafting 40 above their respective take-up reels, and a first and second length of recording tape 41 and 42 are wound between the associated reels. The tapes 41 and 42 in this embodiment are approximately 45 inches long, one inch wide, one and one-half mil thick, Mylar instrumentation tape, which provide fifteen-second messages at a tape speed of three inches per second, for example.

A first and a second twelve-channel magnetic head assembly 44 and 45 are arranged in operating contact with each respective tape, and tape guides 46 are installed to maintain the tapes 41 and 42 in proper contact with the head assemblies 44 and 45. Inside each recoil reel is a clock-type recoil spring 47 which will rewind the tape on its recoil reel whenever the corresponding take-up reel is released. Also, a centrifugal brake assembly 49 connected to each recoil reel limits the rewinding speed.

Around the power shaft 17 in each take-up reel is a series of mechanical stop washers 50 each having a twisted tang 51 which extends into the path of the adjacent tanged washer. A spacer 52 is between the power shaft 17 and the washers 50. A stop pin 54 in the take-up reels 19 and 21 projects axially outwardly to be engageable by the tang on the first stop washer 50.

As shown in FIGURE 3, the last stop washer 50a has a longer tang 51a which will engage and operate the spring-loaded actuator 55 of a limit switch 56b stationarily mounted on the end plate 24a. Thus, for each one revolution, substantially, of the take-up reel, one stop washer 50 will be picked up and carried around. If there are twelve stop washers, this limits the active tape travel to about twelve reel revolutions from start to finish before the limit switch 56b is actuated. The electrical effect of the limit switches 56a and 56b (one for each take-up reel, as shown) in the control circuit will be discussed later.

Still referring to FIGURE 3, an over-ride stop 57 is provided on the end plate 24a, beyond the limit switch 56b in the direction of forward tape travel, to engage the last stop washer 50a in case of electrical failure. In the recoil direction, a spring-loaded recoil stop 59 is provided on the platform 10 to bring the tape and reels to a cushioned stop at the start position, by engaging the last stop washer tang 51a. A means is provided for releasing the centrifugal brake from its associated reel so that stopping inertia forces of the brake are not transmitted to the tape.

Assume duplicate messages pre-recorded on each tape. Transmission of a message is accomplished by coupling one take-up reel to the motor through one clutch solenoid and connecting a certain channel head to an audio output. At the conclusion of the tape, the affected limit switch is actuated, which reverses the bi-directional clutch, keeping the motor running, and engages the other take-up reel of the alternate tape and reel assembly for immediate start, together with switching the audio output to the alternate magnetic head assembly duplicate channel, for repeat of the message. Reversing the clutch also releases the first tape and reel assembly from the drive, and this first tape then rewinds under the action of the recoil spring. De-activating the system returns the clutch to neutral, leaving both take-up reels released, and stops the motor. More detailed operation will be evident after a description of the electrical circuitry.

Figure 5:
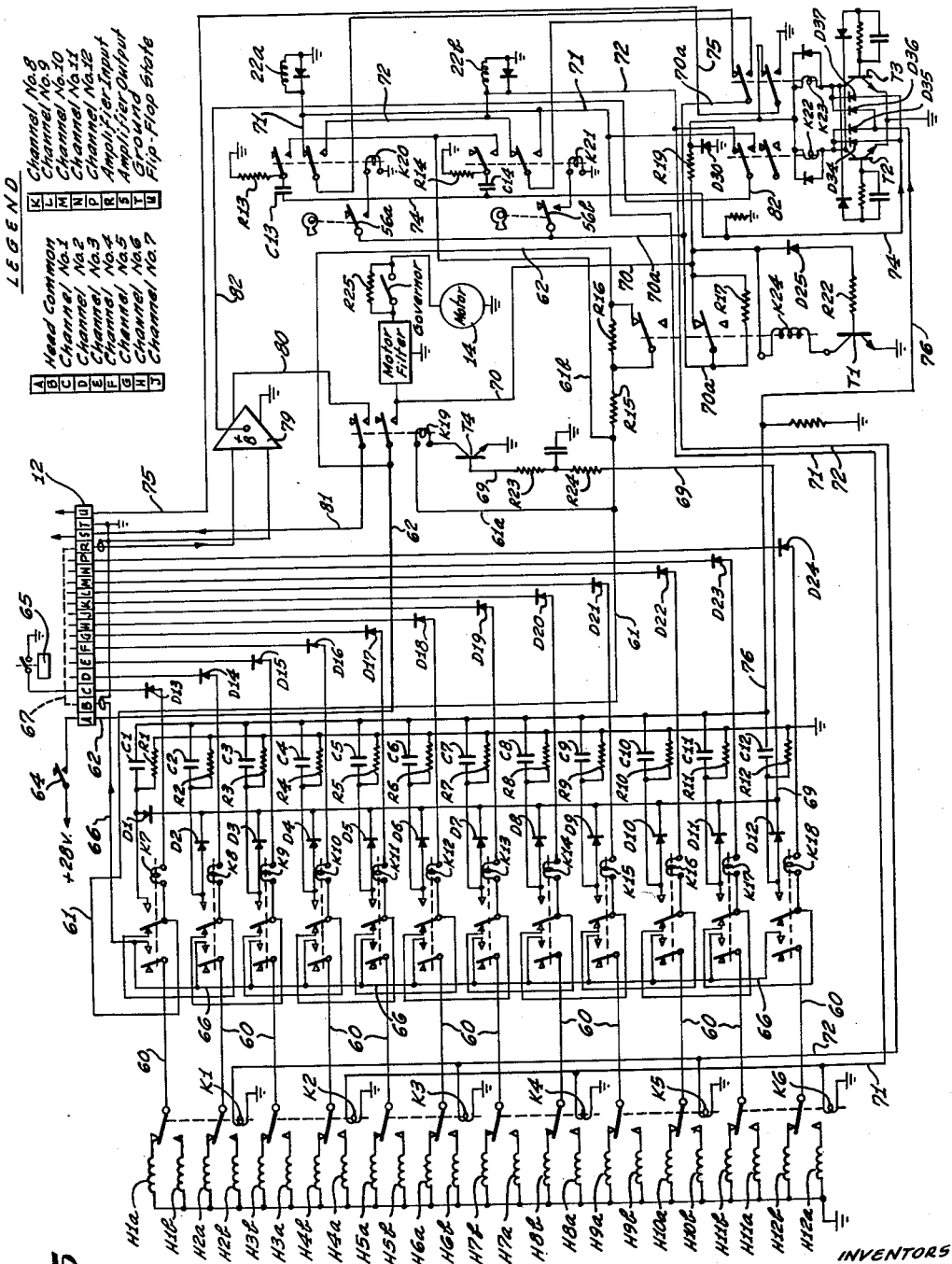
FIGURE 5 is a schematic diagram of the complete electrical network of the present invention.

FIGURE 5 shows the entire circuit for the dual twelve-channel system. Here, magnetic heads H1a through H12a are the twelve heads in the first head assembly 44, and heads H1b through H12b are the corresponding magnetic heads of the second head assembly 45. The left end leads of all heads are grounded. The right end lead of each head goes to a separate contact position of six double-pole head relays K1 through K6.

Twelve head output lines 60 lead from the poles of relays K1 through K6, and these poles will be connected to the heads of either the first or second head assembly 44 or 45, depending upon whether relays K1, K3, and K5 only are energized, or whether relays K2, K4, and K6 only are energized.

Each head output line 60 connects to the left pole of each of twelve separate double-pole signal relays K7 through K17. The right pole of each signal relay K7–K18 connects to one end of its corresponding relay winding, and the other winding end connects through twelve separate input diodes D13–D24 to pins C–P of the plug 12. The right pole of the relay K7 connects to a bus line 61 which leads to one end of a power resistor R15. The bus line 61 is supplied with voltage through R15 and a supply lead 62 from plug pin A, which is connectable through an on-off switch 64 with operating voltage, in this case nominally +28 volts D.C. Besides the regular on-off switch 64, provisions for emergency operation may be made by including an internal power supply and an emergency power switch (not shown).

The right poles of signal relays K8 through K18 are respectively connected to the normally closed contact of the right pole of the adjacent preceding relay. Thus, with the system in operating condition, with no signal relays energized, +28 volts is supplied to the left end of each such relay. However, if a signal relay is energized by grounding any of the plug pins C–P, such as by actuation of a warning signal sensor 65 in channel number one, for example, all other signal relays below that will be de-activated by the opening of the power circuit to the left end of their relay coil.

Therefore, if while signal relay K12 is energized, for example, and a grounded connection should be made at pin L, nothing would happen since the corresponding signal relay K15 could not be energized; but if a grounded connection should be made at pin E, its corresponding signal relay K9 would be energized and signal relay K12 would become deenergized. This is part of the priority circuitry whereby when the most serious emergency warning is assigned to channel number one, plug pin C, and the remainder in numerical order in descending priority, warning messages for the more serious malfunctions are always able to be transmitted through the system.

The normally open contact of the left pole of each signal relay K7–K18 is connected to a common head line 66 leading to pin B of the plug 12. This is the message-carrying line and is connected by a jumper 67 from pin B to pin R in the receptacle (not shown) which fits plug 12. Jumper 67 is shown in dotted lines to indicate it is not there when the plug 12 is disconnected, and provides that recording means can be connected to pin B to record the desired messages using the respective magnetic heads H1–H12.

When the on-off switch 64 is closed, operating voltage through resistor R15 also appears on branch bus line 61a which connects to one coil end of a double-pole power control relay K19. The other end of K19 connects to the collector of a power control transistor T4, whose emitter is grounded. The base circuit of T4 is normally essentially open-circuited, so that the transistor is cut off, and relay K19 is deenergized. In a base lead 69, two base resistors R23 and R24 are provided for proper bias current, and the lead 69 then connects to twelve parallel signal diodes D1 through D12, one for each message channel. The other side of each latter diode is connected to the normally open contact of the right pole of each signal relay K7–K18.

When any signal relay K7–K18 is energized by a warning sensor actuation as previously mentioned, the left side of its associated signal diode D1–D12 is thereby connected to the bus line 61, and base current will flow in transistor T4, thus causing collector conduction and energization of relay K19. This starts the motor 14 through the normally open contact of the lower pole of relay K19, and feeds operating voltage on a feed line 70 through a regulating resistor R19 to the collector circuit of a flip-flop comprising transistors T2 and T3, this collector circuit including flip-flop relays K22 and K23 as shown. A voltage regulating zener diode D30 is connected from the flip-flop side of resistor R19 to ground.

The feed line 70 also connects through a dropping resistor R17 in parallel with the normally closed contacts of the lower pole of a double-pole voltage regulator relay K24 to a regulated feed line 70a. The latter line connects to one side of each of the tape reel limit switches 56a and 56b, and to the upper pole of flip-flop relay K23. Regulator relay K24 will be described later.

The other side of limit switch 56a connects to one end of a first double-pole control relay K20, and limit switch 56b similarly connects to a second double-pole control relay K21, the lower end of each control relay being grounded. The lower pole of first control relay K20 connects to the normally closed upper pole contact of flip-flop relay K23, and the lower pole of second control relay K21 connects to the normally open upper pole contact of the same relay K23. Normally closed lower pole contact of control relay K20 connects via conductor 71 to normally open lower pole contact of control relay K21 and to the first solenoid coil 22a of the bi-directional solenoid 22, which is grounded at the opposite side. Normally open lower pole contact of control relay K20 connects via wire 72 to normally closed lower pole contact of control relay K21 and to the second solenoid coil 22b which is grounded at the opposite side.

Conductor 71 is further connected to the normally open upper pole contact of flip-flop relay K22 and to one end of each of head relays K2, K4, and K6. Wire 72 is further connected to the normally closed upper pole contact of flip-flop relay K22 and to one end of each of head relays K1, K3, and K5. The other end of each head relay is grounded.

Operating voltage through resistor R15 also appears on branch bus line 61b which connects to the normally open upper pole contacts of control relays K20 and K21. The upper poles of these relays K20 and K21 are respectively connected to ground through resistors R13 and R14, and to a replay trigger line 74 through respective capacitors C13 and C14. Replay trigger line 74 connects through isolating diodes D34 and D37 to the respective collectors of the flip-flop transistors T2 and T3.

A positive pulse on replay trigger line 74 will appear on both collectors and trigger the flip-flop to its opposite stable state. The state of the flip-flop is indicated on indicator line 75 connected from pin U of plug 12 to the lower pole of flip-flop relay K23. Normally open lower pole contact of relay K23 is grounded, while its normally closed contact is connected to the positive voltage supplied to the flip-flop through resistor R19.

A head trigger line 76 is also provided to trigger the flip-flop T2, T3, this line being connected to both collectors through isolating diodes D35 and D36. Head trigger line 76 comes from one side of each of twelve coupling capacitors C1 through C12, one for each message channel. The other side of each coupling capacitor C1–C12 is respectively connected to the normally open right-hand pole contact of its associated signal relay K7–K18, and to a separate load resistor R1 through R12, the other ends of which are grounded.

When any one channel is activated, therefore, energization of its signal relay produces a positive trigger pulse to switch the flip-flop to its opposite state, as well as turn on power control transistor T4 as previously described.

Since the aircraft supply voltage from which the present system is designed to operate will fluctuate considerably around the nominal value of 28 volts D.C., provisions are made to regulate this voltage as supplied to the various components herein. Resistor R19 and zener diode D30 regulate the flip-flop supply voltage at a constant voltage of approximately 15 volts.

Further regulating means is provided by a regulating transistor T1, the regulating relay K24, and voltage-dropping resistors R16 and R17. Another zener diode D25 and a base resistor R22 are connected in series between the feed line 70 and the base of transistor T1, the emitter of which is grounded. The collector is connected to the coil of relay K24, and the other coil end is connected to the feed line 70. At the lower values of supply voltage, relay K24 is deenergized, and its respective poles are shorting out resistors R17 and R16 in feed line 70 and supply lead 62, respectively, to apply essentially full voltage to the loads. At the higher values of supply voltage, zener diode D25 allows some reverse current to flow in it and thus form a base current to cause conduction of transistor T1. Thus, relay K24 will be energized to remove the short circuits across R16 and R17. The latter resistors then reduce the operating voltage on the feed line 70 and supply lead 62 from what they would be without the present regulation.

By this means, the present circuit operates successfully over a range of from 14 to 30 volts D.C. appearing at the on-off switch 64.

The audio output from the message channels at pin B of the plug 12 is fed back in at pin R to a transistorized amplifier 79. An amplifier output line 80 connects to the normally open contact of the upper pole of power control relay K19. The upper pole itself connects via an output lead 81 to plug pin S and from thence to a speaker or headset (not shown).

A B+ supply line 82 to the amplifier 79 connects to the upper pole of flip-flop relay K22, to which B+ supply voltage may be supplied from conductor 71 or wire 72. Operation of this circuit will be detailed later in this specification.

Overall operation of the present system will now be reviewed. With the on-off switch 64 closed, the system is in readiness, but the motor 14 is not running and no current is being drawn by the control circuitry. Clutch spool 20 is disengaged, and both tape and reel assemblies are in their rewound positions ready to start. The audio output is open-circuited at the upper pole of control relay K19, thus presenting infinite impedance to whatever sound reproducing means is being used, for example a pilot's headset.

In the event of grounding of any of the warning lines connected to pins C through P of plug 12 by its associated sensor, such as sensor 65, a corresponding signal relay K7–K18 will be energized, turning on power control transistor T4 and energizing power control relay K19, and sending a positive pulse via head trigger line 76 to the flip-flop T2, T3, while at the same time disabling all signal relays below the one actuated. Energizing relay K19 supplies operating voltage to start the motor 14, energize the flip-flop, and thus energize either solenoid coil 22a or solenoid coil 22b. Supposing the flip-flop started with the left side conducting, flip-flop relay K22 will be energized, thus energizing solenoid 22a through the upper pole of flip-flop relay K23 and lower pole of control relay K20. With the flip-flop in the other state, solenoid 22b would be energized.

With the solenoid 22a energized as assumed, head relays K2, K4, and K6 are energized, so that the twelve "a" heads of the first magnetic head assembly 44 are selected, and the first take-up reel 19 is being driven. The message corresponding to the initially activated channel is connected by means of its energized signal relay to pin B of the plug 12 and is being reproduced through amplifier 79.

At the end of tape travel, limit switch 56a closes, thus energizing relay K20. From the upper pole of this relay, a positive pulse is sent along replay trigger line 74 to trigger the flip-flop so that flip-flop relay K23 becomes energized, and from the lower pole of relay K20, the solenoid 22a is disconnected. However, switching the flip-flop energizes solenoid 22b through the upper pole of relay K23 and lower pole of relay K21.

When energization of the solenoids 22a and 22b is alternated, head relays K2, K4, and K6 are deenergized and relays K1, K3, and K5 are energized, thus selecting all the twelve "b" heads of the second head assembly 45. Of course energizing solenoid 22b and releasing solenoid 22a reverses the clutch and starts driving the second take-up reel 21, which was in standby condition, and releases the first take-up reel 19 which then rewinds through action of its recoil spring 47. Now the message is being repeated by the "b" head of the same channel which was activated, from the same message recorded in that channel on the second tape. Until the warning conditions disappear, or the pilot opens the on-off switch 64, the system as shown will continue in the manner described, starting immediately at the beginning of the opposite tape assembly when the one which is running reaches its end. It is easily seen that this apparatus eliminates a delay in reproduction which would be caused by having to wait for a rewinding operation in a normal system. Operation is uninterrupted with the present system.

Due to the priority network described, a higher priority warning than the one in progress will send a positive pulse on head trigger line 76, thus triggering the flip-flop, reversing clutch solenoids, and switching head assemblies to the new channel on the standby tape assembly, thereby starting the new higher priority warning message immediately.

In the remotely possible event that a higher priority emergency arises just after switching from one reel to the other for an existing warning, and prior to the time that the alternate tape has become rewound to starting position, a special interlocking circuit comes into play to prevent the audio reproduction of the rewinding tape, by temporarily removing the B+ operating voltage from the amplifier 79. This is accomplished as follows.

It is seen from FIGURE 3 that the limit switches will remain closed until the tape is rewound and the last stop washer 50a is picked up and moved away from the limit switch actuator. Thus, although the flip-flop has been switched, the lower pole of the relay associated with the closed limit switch will maintain the previous clutch solenoid energized and prevent energization of the other clutch solenoid, thus opening the amplifier B+ circuit at the upper pole of flip-flop relay K22. A short period of silence will occur at the system output until the tape which is rewinding reaches starting position and opens its limit switch. This will release its affected control relay K20 or K21 and allow alternate clutch solenoid and head switching, and restore operating voltage to the amplifier on the B+ supply line 82. It is important to note that the above delay can occur only if two flip-flop switching signals occur within three seconds of each other, since the rewind time is only approximately three seconds.

It is thus seen that an extremely versatile, capable and reliable warning signal system has been provided by the present invention. Although twelve-channel magnetic heads have been disclosed herein, providing twelve warning messages, the system can be expanded to accommodate twenty channels on a one-inch wide magnetic tape. Provisions may be made for a functional check of all circuits and components in the system, and for disabling any one channel only, in case of a false malfunction indication.

The electronics is completely transistorized, requiring no warm-up time and minimum space. Everything is included in one package consisting of the housing 11 on platform 10. In one embodiment actually built, the logic network is put in a space measuring only 2¾ x 2½ x 1½ inches at one end of the housing, and the audio amplifier 79 is in a space measuring only 2¾ x 2¼ x 7/16 inches at the other end, beyond the extremes of the tape handling mechanism.

This particular embodiment is designed for an airborne warning system, but any type of message of various lengths can be recorded on the tapes as desired. For instance, a five-second message would be repeated twice on one tape assembly, while a thirty-second message would be reproduced once by running one tape assembly for the first half, and then automatic switching to the other would reproduce the second half if the message was so pre-recorded. The invention is not limited to what it is used for, or what recordings are to be placed on the tapes. For instance, it has applications in atomic reactor operation, submarines, hospitals, and manufacturing processes, to name a few.

It is further evident that a different form of signal system could be employed in this invention, such as a multiturn magnetic drum, for example. The magnetic heads would be coupled to the drum through a gear train and a lead screw. When the end of the spiral message is reached, the drum is uncoupled and a spring returns the parts to starting position. An endless belt magnetic tape system with means for returning it to a pre-determined starting position might also be used, or even other types of systems such as disc records or the like, if desired.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

We claim:
1. An audio warning system comprising a first and a second signal reproducing assembly, a motor, two-way clutch means driven by said motor and having a central disengaged position, first drive means engageable by said clutch means in one driving position thereof to drive said first reproducing assembly, second drive means engageable by said clutch means in the other driving position thereof to drive said second reproducing assembly, selector means for connecting either of said signal reproducing assemblies to a signal output, and control means connected to said clutch means and to said selector means to connect only the engaged driven reproducing assembly to said signal output, said reproducing assemblies being capable of having verbal messages recorded thereon.

2. An audio warning system comprising a first and a second signal reproducing assembly, a motor, two-way clutch means driven by said motor and having a central disengaged positions, first drive means engageable by said clutch means in one driving position thereof to drive said first reproducing assembly, second drive means engageable by said clutch means in the other driving position thereof to drive said second reproducing assembly, each of said signal reproducing assemblies being a multiple channel device capable of having verbal messages recorded thereon, an energizing circuit for each channel of said signal reproducing assemblies, said circuits being normally open, and control means responsive to closing of any one of said energizing circuits to start said motor, engage said clutch means with one of said reproducing assemblies, and connect the energized channel of said one reproducing assembly to a signal output.

3. An audio warning system comprising a first and a second signal reproducing assembly, a motor, a two-way clutch driven by said motor, first drive means engageable by said clutch in one driving position thereof to drive said first reproducing assembly, a second drive means engageable by said clutch in the other driving position thereof to drive said second reproducing assembly, said reproducing assemblies being capable of having verbal messages recorded thereon, and each of said signal reproducing assemblies having elastic means connected thereto to return it to a predetermined starting position when disengaged from said clutch.

4. An audio warning system comprising a first and a second multiple-channel signal reproducing assembly, a motor, bi-directional clutch means driven by said motor and engageable with either of said reproducing assemblies, first and second clutch engaging means for respectively connecting said motor to drive said reproducing assemblies, an input energizing circuit for each channel of said reproducing assemblies, said circuits being normally open and having a priority assigned thereto, control means responsive to closing of any one of said energizing circuits to energize only one of said clutch engaging means and connect the energized channel of the engaged reproducing assembly to a signal output, and priority logic means interconnecting all said input energizing circuits to deactivate all energizing circuits of a lower priority than a closed energizing circuit.

5. Apparatus in accordance with claim 4 including a limit switch for each signal reproducing assembly, actuating means for operating said limit switch at the end of forward travel of said reproducing assembly, said limit switches being connected to said control means to reverse both the energization of said two clutch engaging means and the signal output connection of said energized channel so that the opposite signal reproducing assembly is operatively driven and connected.

6. Apparatus in accordance with claim 4 wherein said signal reproducing assemblies each comprise a two-reel magnetic tape system having a multiple-channel magnetic head in position to record and reproduce messages on magnetic tape wound on a take-up reel and a recoil reel, said take-up reel being connected to one driven side of said two-way clutch means, said recoil reel having a recoil spring connected thereto for automatic rewinding when said take-up reel is not engaged by said clutch means.

7. Apparatus in accordance with claim 4 wherein said control means comprises a bi-stable transistorized flip-flop circuit.

8. Apparatus in accordance with claim 4 wherein said control means comprises a bi-stable flip-flop, and including triggering means connected from each of said input energizing circuits to said flip-flop to trigger said flip-flop when any of said energizing circuits are closed from an open circuit condition, said first clutch engaging means connected to be energized in one stable state of said flip-flop, said second clutch engaging means connected to be energized in the other stable state of said flip-flop, a multiple magnetic head assembly included in each signal reproducing assembly, a head output line for each channel of said system for connection to said signal output, first and second two-position head switching relay means, the individual heads of said head assemblies connected to the position contacts of said relay means and said head output lines being connected to the respective poles of said relay means, approximately half of the heads of one multiple head assembly connected to normally closed contacts of said first relay means, the remaining heads of said one multiple head assembly connected to normally open contacts of said second relay means, approximately half of the heads of the other multiple head assembly connected to normally open contacts of said first relay means, the remaining heads of said other head assembly connected to normally closed contacts of said second relay means, said first head switching relay means connected to be energized in one stable state of said flip-flop, and said second relay means connected to be energized in the other stable state of said flip-flop, whereby in either energized state of said flip-flop, all heads of the multiple head assembly of the driven signal reproducing assembly are connected to said head output lines, and whereby the electrical load on said system is substantially equal for both said flip-flop states.

9. Apparatus in accordance with claim 4 wherein said control means comprises a bi-stable flip-flop circuit with two control relay means in the respective sides thereof to be energized when their corresponding sides are conducting, said control relay means being operatively connected to control energization of said first and second clutch engaging means.

10. Apparatus in accordance with claim 4 wherein said control means comprises a bi-stable flip-flop circuit which is normally deenergized with no operating power connected thereto, and means for connecting operating power thereto when any of said input energizing circuits is closed.

11. Apparatus in accordance with claim 4 including a hollow shaft continuously connected to said motor, both of said signal reproducing assemblies having drive elements rotatably mounted on said shift, said clutch means comprising a member coaxially mounted on said shaft and rotatably driven thereby, said member located between said drive elements and being slidable lengthwise of said shaft to an engaged driving position with either of said drive elements, said first and second clutch engaging means comprising first and second spaced solenoids concentric with said shaft having a single armature therebetween, an armature rod fixed to said armature and extending through said shaft, a slot in said shaft adjacent said clutch member, and axial coupling means between said armature rod and said clutch member through said slot.

12. Apparatus in accordance with claim 4 wherein said warning system is adapted to be operated from a D.C. power supply, and including voltage regulating means enabling operation of said system throughout a range of supply voltage of from about 14 to about 30 volts, said voltage regulating means comprising a voltage dropping resistance in a power supply lead, relay operated switching means which in one position shorts across said resistance, and supply voltage responsive means connected to said relay to actuate said switching means to another position which unshorts said resistance when supply voltage rises.

13. Apparatus in accordance with claim 4 wherein said control means comprises a bi-stable flip-flop, triggering means connected from each of said input energizing circuits to said flip-flop, said first clutch engaging means operatively connected to said flip-flop to be energized in one state thereof, said second clutch engaging means operatively connected to said flip-flop to be energized in the other state thereof, a head output line for each channel for connection to said signal output, means for switching said head output line between the two corresponding channels in said first and second signal reproducing assemblies, and actuating means for said head switching means connected to said flip-flop to be alternately energized and deenergized in the respective flip-flop states.

14. Apparatus in accordance with claim 13 including a limit switch for each signal reproducing assembly, actuating means for operating said limit switch at the end of forward travel of said reproducing assembly, and means responsive to operation of either of said limit switches to trigger said flip-flop and thus reverse the energization of said clutch engaging means and operatively connect the opposite signal reproducing assembly to said signal output.

15. A multiple channel audio warning system comprising a first and a second two-reel magnetic tape assembly each having a multiple-channel magnetic head, a motor, a two-way clutch driven by said motor and engageable with a take-up reel of either of said tape assemblies, a recoil spring in each tape assembly connected to a recoil reel thereof for automatic rewinding when its associated tape assembly is not engaged by said clutch, an input energizing circuit for each channel of said system, said circuits being normally open and inactive, control means responsive to closing of any one of said input circuits to energize said clutch in one direction and connect the magnetic head corresponding to the energized channel and driven tape assembly to a signal output, limit switch means in each tape assembly actuated at the end of forward travel thereof and connected to reverse said control means to operatively start and connect the corresponding head of the other tape assembly while allowing the first to rewind, priority logic means interconnecting all said input circuits to reverse said control means when a higher priority input circuit is closed while a lower priority input circuit is already closed, and delay means connected between said limit switch means and said control means to delay reversal thereof when a higher priority input circuit is closed while a disengaged tape assembly is still rewinding.

16. Apparatus in accordance with claim 15 wherein each of said limit switch means includes a limit switch, mechanical means for actuating said limit switch at the end of forward travel of its associated tape assembly, and means for maintaining said limit switch actuated until said tape mechanism has returned to its rewound position.

17. An audio warning system comprising a first and a second multiple-channel signal reproducing assembly, a motor, bi-directional clutch means driven by said motor and engageable with either of said reproducing assemblies, first and second clutch engaging means for respectively connecting said motor to drive said reproducing assemblies, an input energizing circuit for each channel of said reproducing assemblies, said circuits being normally open and having a priority assigned thereto, control means including a bi-stable electrical switching device responsive to closing of any one of said energizing circuits to energize only one of said clutch engaging means and connect the energized channel of the engaged reproducing assembly to a signal output, and priority logic means interconnecting all said input energizing circuits to deactivate all energizing circuits of a lower priority than a closed energizing circuit.

References Cited in the file of this patent

UNITED STATES PATENTS

| | | |
|---|---|---|
| 1,991,727 | Brimberg | Feb. 19, 1935 |
| 2,764,639 | Holt | Sept. 25, 1956 |
| 2,777,901 | Dostert | Jan. 15, 1957 |
| 2,804,501 | Hart | Aug. 27, 1957 |